United States Patent
Shinohara et al.

(10) Patent No.: US 11,840,603 B2
(45) Date of Patent: Dec. 12, 2023

(54) POLYESTER RESIN AND METHOD FOR PRODUCING POLYESTER RESIN

(71) Applicant: MITSUBISHI GAS CHEMICAL COMPANY, INC., Chiyoda-ku (JP)

(72) Inventors: Katsumi Shinohara, Niigata (JP); Kazua Sato, Niigata (JP); Hiroki Ikarashi, Niigata (JP)

(73) Assignee: MITSUBISHI GAS CHEMICAL COMPANY, INC., Chiyoda-Ku (JP)

( * ) Notice: Subject to any disclaimer, the term of this patent is extended or adjusted under 35 U.S.C. 154(b) by 0 days.

(21) Appl. No.: 18/249,208

(22) PCT Filed: Nov. 8, 2021

(86) PCT No.: PCT/JP2021/040911
§ 371 (c)(1),
(2) Date: Apr. 14, 2023

(87) PCT Pub. No.: WO2022/102553
PCT Pub. Date: May 19, 2022

(65) Prior Publication Data
US 2023/0312817 A1    Oct. 5, 2023

(30) Foreign Application Priority Data
Nov. 12, 2020    (JP) ................. 2020-188436

(51) Int. Cl.
*C08G 63/672*    (2006.01)

(52) U.S. Cl.
CPC .................. *C08G 63/672* (2013.01)

(58) Field of Classification Search
USPC ....................................... 528/298
See application file for complete search history.

(56) References Cited

U.S. PATENT DOCUMENTS

| | | |
|---|---|---|
| 2012/0128984 A1 | 5/2012 | Kawabata |
| 2021/0106027 A1 | 4/2021 | Minami et al. |

FOREIGN PATENT DOCUMENTS

| | | |
|---|---|---|
| JP | H 6-287287 | 10/1994 |
| JP | 2003-212981 A | 7/2003 |
| JP | 2004-143353 A | 5/2004 |
| JP | 2005-314643 A | 11/2005 |
| JP | 2008-260963 A | 10/2008 |
| JP | 2019-112588 A | 7/2019 |
| WO | WO 2011/016373 A1 | 2/2011 |
| WO | WO 2018/198845 A1 | 11/2018 |

OTHER PUBLICATIONS

Written Opinion dated Jan. 11, 2022, in PCT/JP2021/040911 (with English translation).

*Primary Examiner* — Terressa Boykin
(74) *Attorney, Agent, or Firm* — Oblon, McClelland, Maier & Neustadt, L.L.P.

(57) ABSTRACT

A polyester resin containing: a diol constituent unit containing a unit a1 derived from spiroglycol represented by formula (1) and a unit a2 derived from ethylene glycol; and a dicarboxylic acid constituent unit containing a unit b derived from terephthalic acid and/or an ester thereof. A content of the unit a1 is from 5 to 60 mol % and a content of the unit a2 is from 30 to 95 mol %, based on a total amount of the unit a1 and the unit a2. A content of the unit b is from 80 to 100 mol % based on a total amount of the dicarboxylic acid constituent unit.

(1)

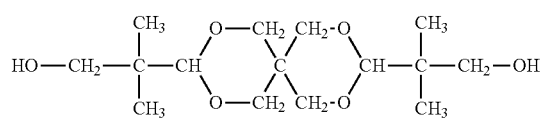

4 Claims, No Drawings

POLYESTER RESIN AND METHOD FOR PRODUCING POLYESTER RESIN

CROSS-REFERENCE TO RELATED APPLICATIONS

The present application is a 35 U.S.C. § 371 National Stage Application of International Patent Application PCT/JP2021/040911, filed Nov. 8, 2021, which is based on and claims the benefit of priority to Japanese Application No. 2020-188436, filed Nov. 12, 2020. The entire contents of these applications are incorporated herein by reference.

TECHNICAL FIELD

The present invention relates to a polyester resin and a method for producing the polyester resin.

BACKGROUND ART

Polyethylene terephthalate (PET), which is a versatile polyester, is well-known to be excellent in: mechanical properties such as tensile strength, elongation, Young's modulus, and elastic recovery; physical properties such as thermal resistance and dimensional stability; and chemical properties such as chemical resistance and water resistance, and to require a low cost, and thus has significant industrial value. The polyethylene terephthalate has been widely used for, for example, fibers, tire cords, bottles, and films. However, in a field of sheets requiring transparency, PET crystallizes too fast and whitening tends to occur due to crystallization at the time of secondary processing, and thus PET modified with cyclohexanedimethanol or the like has been used. Furthermore, in a field of bottles, to slow the crystallization speed of PET, an expensive germanium compound has been used as a catalyst, and modified PET produced by copolymerization using isophthalic acid or cyclohexanedimethanol as a modification component for the PET has been used.

Meanwhile, because the modified PET described above and the like have poor thermal resistance, use thereof tends to be limited in the field requiring thermal resistance, such as fields of illumination boards, carports, and thermally resistant food containers. Taking this into consideration, a polyester resin produced by copolymerization with 3,9-bis(1,1-dimethyl-2-hydroxyethyl)-2,4,8,10-tetraoxaspiro[5.5]undecane (hereinafter, also referred to as "spiroglycol" or "SPG") as a diol component has been proposed. Specifically, for example, Patent Documents 1 to 3 each propose a polyester resin containing an SPG-derived constituent unit or a production method thereof.

CITATION LIST

Patent Document

Patent Document 1: JP 2008-260963 A
Patent Document 2: JP 2005-314643 A
Patent Document 3: JP 2003-212981 A

SUMMARY OF INVENTION

Technical Problem

The present inventors have studied the polyester resins described in Patent Documents 1 to 3 and found that an intrinsic viscosity (IV) of a polyester resin tends to decrease when shearing is performed in a typical condition, and as a result, physical properties of a molded body thereof tend to deteriorate.

The present invention has been completed in response to the above issues of the conventional technologies, and an object of the present invention is to provide a polyester resin with less reduction in intrinsic viscosity at the time of melt retention/melt extrusion, and a production method thereof.

Solution to Problem

As a result of diligent research, the present inventors have found that the above issues can be solved by, in particular, adjusting physical properties of a polyester resin using a reduction percentage of intrinsic viscosities before and after a predetermined melt retention/melt extrusion operation as an index, and thus completed the present invention.

That is, the present invention includes the following aspects.

[1]
A polyester resin comprising:
a diol constituent unit comprising a unit a1 derived from spiroglycol represented by formula (1) and a unit a2 derived from ethylene glycol; and
a dicarboxylic acid constituent unit comprising a unit b derived from terephthalic acid and/or an ester thereof, wherein
a content of the unit a1 is from 5 to 60 mol % and a content of the unit a2 is from 30 to 95 mol %, based on a total amount of the unit a1 and the unit a2,
a content of the unit b is from 80 to 100 mol % based on an amount of all the dicarboxylic acid constituent unit, and
the following conditions (1) to (3) are satisfied:
(1) an intrinsic viscosity V1 of the polyester resin is from 0.45 to 0.85 dL/g, the intrinsic viscosity V1 being measured at 25° C. by using a mixed solvent comprising phenol and 1,1,2,2-tetrachloroethane in a weight ratio of 6:4;
(2) when an operation of extruding the polyester resin at a shear rate of 122 (l/s) is performed after the polyester resin is kept at 240° C. for 5 minutes, a reduction percentage of intrinsic viscosities before and after the operation, in terms of (V1-V2)/V1, is 3% or less, where V2 refers to an intrinsic viscosity measured based on the condition (1) after the operation; and
(3) a glass transition temperature of the polyester resin measured by a differential scanning calorimeter is 90° C. or higher and a heat quantity of a crystallization exothermic peak during temperature decrease is 5 J/g or less.

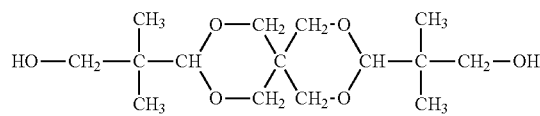

(1)

[2]
The polyester resin according to [1], wherein the content of the unit b is from 95 to 100 mol %.

[3]
The polyester resin according to [1] or [2], wherein the content of the unit a1 is from 15 to 60 mol %, and the content of the unit a2 is from 40 to 85 mol %, based on the total amount of the unit a1 and the unit a2.

[4]

A method for producing the polyester resin according to any one of [1] to [3], the method comprising:
subjecting the ethylene glycol and the terephthalic acid and/or an ester thereof to an esterification reaction to thereby produce a precursor ester; and
adding the spiroglycol to the precursor ester,
wherein, in the adding, stirring is performed under a condition expressed by expressions (A) and (B) below by using a stirrer equipped with a stirring blade:

0.7011×log (spiroglycol addition rate (kg/hr))+ 1.339+0.5≥stirring blade tip speed (m/s)≥0.7011×log (spiroglycol addition rate (kg/hr))+1.339−0.5   expression (A)

0.5≤stirring blade tip speed (m/s)   expression (B).

[5]

The method for producing the polyester resin according to [4], wherein a temperature of the precursor ester in the adding is 195° C. or lower.

[6]

The method for producing the polyester resin according to [4] or [5], wherein storage, transfer, and addition of the spiroglycol are performed in an inert gas atmosphere.

[7]

The method for producing the polyester resin according to any one of [4] to [6], wherein a moisture content of the spiroglycol is 0.1 mass % or less.

Advantageous Effects of Invention

According to the present invention, a polyester resin with less reduction in intrinsic viscosity at the time of melt retention/melt extrusion, and a production method thereof can be provided.

DESCRIPTION OF EMBODIMENTS

Hereinafter, embodiments for carrying out the present invention (referred to simply as "the present embodiments" below) will be described in detail. The following embodiments are examples for explaining the present invention, and do not limit the contents of the present invention. The present invention can be modified as appropriate within the scope of the gist. Note that, "(from) . . . to . . . " in the present description includes both of the numerical values as the upper limit value and the lower limit value unless otherwise noted.

Polyester Resin

The polyester resin of the present embodiment contains: a diol constituent unit containing a unit a1 derived from spiroglycol represented by formula (1) (hereinafter, also simply referred to as "spiroglycol" or "SPG") and a unit a2 derived from ethylene glycol; and a dicarboxylic acid constituent unit containing a unit b derived from terephthalic acid and/or an ester thereof. A content of the unit a1 is from 5 to 60 mol % and a content of the unit a2 is from 30 to 95 mol %, based on a total amount of the unit a1 and the unit a2. A content of the unit b is from 80 to 100 mol % based on a total amount of the dicarboxylic acid constituent unit. The polyester resin of the present embodiment the following conditions (1) to (3):

(1) an intrinsic viscosity V1 of the polyester resin is from 0.45 to 0.85 dL/g, the intrinsic viscosity V1 being measured at 25° C. by using a mixed solvent containing phenol and 1,1,2,2-tetrachloroethane in a weight ratio of 6:4;
(2) when an operation of extruding the polyester resin at a shear rate of 122 (l/s) is performed after the polyester resin is kept at 240° C. for 5 minutes, a reduction percentage of intrinsic viscosities before and after the operation, in terms of (V1-V2)/V1, is 3% or less, where V2 refers to an intrinsic viscosity measured based on the condition (1) after the operation; and
(3) a glass transition temperature of the polyester resin measured by a differential scanning calorimeter is 90° C. or higher and a heat quantity of a crystallization exothermic peak during temperature decrease is 5 J/g or less.

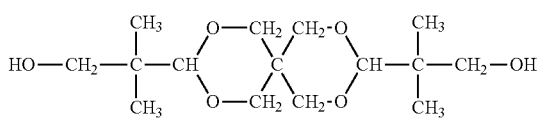

(1)

Because the polyester resin of the present embodiment is configured as described above, reduction of the intrinsic viscosity at the time of melt retention/melt extrusion becomes small. In more detail, for example, difficulty in controlling extrusion pressure of an extruder (Note: this tendency will be significant especially when one lot is changed to another) can be prevented at the time of melting for molding.

Diol Constituent Unit

The polyester resin of the present embodiment contains, as a diol constituent unit, a unit a1 derived from spiroglycol represented by formula (1) above and a unit a2 derived from ethylene glycol. A content of the unit a1 is from 5 to 60 mol % and a content of the unit a2 is from 30 to 95 mol %, based on a total amount of the unit a1 and the unit a2. By blending the unit a1 and the unit a2 as described above, the polyester resin of the present embodiment tends to have excellent balance of thermal resistance, transparency, moldability, and mechanical performance.

From a similar viewpoint, the content of the unit a1 is preferably from 15 to 60 mol %, and more preferably from 20 to 45 mol %. Similarly, the content of the unit a2 is preferably from 40 to 85 mol %, and more preferably from 50 to 80 mol %.

Furthermore, from a similar viewpoint, the total amount of the unit a1 and the unit a2 can be 47 mol % or greater, and is preferably 57 mol % or greater, and more preferably 72 mol % or greater, based on the amount of all the diol constituent units. The total amount of the unit a1 and the unit a2 can be 100 mol %.

The polyester resin of the present embodiment may contain a unit a3 derived from a diol other than the spiroglycol and the ethylene glycol as a diol constituent unit. Specific examples of the unit a3 include, but not limited to, units derived from: aliphatic diols such as trimethylene glycol, 2-methylpropanediol, 1,4-butanediol, 1,5-pentanediol, 1,6-hexanediol, diethylene glycol, triethylene glycol, propylene glycol, and neopentyl glycol; polyether compounds such as polyethylene glycol, polypropylene glycol, and polybutylene glycol; tri- or higher polyhydric alcohols such as glycerin, trimethylolpropane, and pentaerythritol; alicyclic diols such as 1,3-cyclohexanedimethanol, 1,4-cyclohexanedimethanol, 1,2-decahydronaphthalene dimethanol, 1,3-decahydronaphthalene dimethanol, 1,4-decahydronaphthalene dimethanol, 1,5-decahydronaphthalene dimethanol, 1,6-decahydronaphthalene dimethanol, 2,7-decahydronaphthalene dimethanol, tetralin dimethanol, norbornane dimethanol, tricyclodecane dimethanol, 5-methylol-5-ethyl-2-(1,1-dimethyl-2-hydroxyethyl)-1,3-dioxane, and pentacyclodecane dimethanol; alkylene oxide adducts of bisphenols such as 4,4'-(1-methylethylidene)bisphenol, methylenebisphenol (bisphenol F), 4,4'-cyclohexylidenebisphenol (bisphenol Z), and 4,4'-sulfonylbisphenol (bisphenol S); and alkylene oxide adducts of aromatic dihydroxy compounds such as hydroquinone, resorcin, 4,4'-dihydroxybiphenyl, 4,4'-dihydroxydiphenyl ether, and 4,4'-dihydroxydiphenylbenzophenone.

The content of the unit a3 can be 53 mol % or less, and is preferably 43 mol % or less, and more preferably 28 mol % or less, based on the amount of all the diol constituent units. The content of the unit a3 can be 0 mol %.

Dicarboxylic Acid Constituent Unit

The polyester resin of the present embodiment contains a unit b derived from terephthalic acid and/or an ester thereof as a dicarboxylic acid constituent unit. The content of the unit b is from 80 to 100 mol % based on the total amount of the dicarboxylic acid constituent unit. By blending the unit b as described above, the polyester resin of the present embodiment tends to have excellent balance of thermal resistance, transparency, moldability, and mechanical performance.

From a similar viewpoint, the content of the unit b is preferably from 95 to 100 mol %.

The polyester resin of the present embodiment may contain a unit b' derived from a dicarboxylic acid and/or an ester thereof other than the terephthalic acid and the ester thereof as a dicarboxylic acid constituent unit. Specific examples of the unit b' include, but not limited to, units derived from isophthalic acid, phthalic acid, 2-methylterephthalic acid, naphthalenedicarboxylic acid, biphenyldicarboxylic acid, tetralindicarboxylic acid, succinic acid, glutaric acid, adipic acid, pimelic acid, suberic acid, azelaic acid, sebacic acid, dodecanedicarboxylic acid, cyclohexanedicarboxylic acid, decalin dicarboxylic acid, norbornanedicarboxylic acid, tricyclodecanedicarboxylic acid, pentacyclododecanedicarboxylic acid, isophoronedicarboxylic acid, 3,9-bis(2-carboxyethyl)2,4,8,10-tetraoxaspiro[5.5] undecane, trimellitic acid, trimesic acid, pyromellitic acid, tricarballylic acid, and ester compounds of these.

Physical Properties of Polyester Resin

The polyester resin of the present embodiment satisfies the following condition (1):
(1) an intrinsic viscosity V1 of the polyester resin is from 0.45 to 0.85 dL/g, the intrinsic viscosity V1 being measured at 25° C. by using a mixed solvent containing phenol and 1,1,2,2-tetrachloroethane in a weight ratio of 6:4.

The intrinsic viscosity V1 of less than 0.45 dL/g is not preferred because handling of the polyester resin becomes difficult. Specifically, since the viscosity in a molten state is too low and mechanical properties are low causing brittleness, for example, it becomes difficult to take out the product from the production apparatus of the polyester resin and to pelletize. On the other hand, the intrinsic viscosity V1 of greater than 0.85 dL/g is not preferred because the melt viscosity at the time of processing of the polyester resin becomes excessively large, fluidity may deteriorate, and excessive heating may be required to achieve fluidity.

From a similar viewpoint, the intrinsic viscosity V1 is preferably from 0.47 to 0.79 dL/g, and more preferably from 0.51 to 0.74 dL/g.

Specifically, the intrinsic viscosity V1 can be measured by the method described in Examples below.

For example, the intrinsic viscosity V1 can be adjusted to the range described above by appropriately adjusting a copolymerization ratio of starting monomers of the polyester resin.

The polyester resin of the present embodiment satisfies the following condition (2):
(2) when an operation of extruding the polyester resin at a shear rate of 122 (1/s) is performed after the polyester resin is kept at 240° C. for 5 minutes, a reduction percentage of intrinsic viscosities before and after the operation, in terms of (V1−V2)/V1, is 3% or less, where V2 refers to an intrinsic viscosity measured based on the condition (1) after the operation.

When the reduction percentage of the intrinsic viscosities is greater than 3% and processing into a molded body is performed, performances that can be potentially exhibited by the polyester resin serving as a raw material cannot be exhibited, and as a result, mechanical properties and the like of the molded body are impaired.

From a similar viewpoint, the reduction percentage of the intrinsic viscosities is preferably 2.5% or less, and more preferably 2% or less. The lower limit value of the reduction percentage of the intrinsic viscosities is not particularly limited and may be 0%.

Specifically, the reduction percentage of the intrinsic viscosities can be measured by the method described in Examples below.

For example, the reduction percentage of the intrinsic viscosities can be adjusted to the range described above by employing a preferred production method described below or by removing a thermally modified product of unreacted SPG that can be generated in the production process of the polyester resin.

The polyester resin of the present embodiment satisfies the following condition (3):
(3) a glass transition temperature of the polyester resin measured by a differential scanning calorimeter is 90° C. or higher and a heat quantity of a crystallization exothermic peak during temperature decrease is 5 J/g or less.

When the glass transition temperature is in the range described above, practically effective thermal resistance is achieved. When the heat quantity of the crystallization exothermic peak during temperature decrease is in the range described above, excellent transparency, moldability, and secondary processing are achieved.

From a similar viewpoint, the glass transition temperature is preferably 97° C. or higher, and more preferably 105° C. or higher. Furthermore, the heat quantity of the crystallization exothermic peak during temperature decrease is preferably 3 J/g or less, more preferably 1 J/g or less, and even more preferably 0.1 J/g or less.

Specifically, the glass transition temperature and the heat quantity of the crystallization exothermic peak during temperature decrease can be measured by the methods described in Examples below. For example, the glass transition temperature and the heat quantity of the crystallization exothermic peak during temperature decrease can be adjusted to the ranges described above by appropriately adjusting a copolymerization ratio of starting monomers of the polyester resin.

Method for Producing Polyester Resin

The polyester resin of the present embodiment is not particularly limited as long as the configuration described above is achieved. In the present embodiment, from a viewpoint of efficiently producing a polyester resin having a lower reduction percentage of the intrinsic viscosities, the following production method is preferably employed. That is, a preferred method for producing the polyester resin of the present embodiment (hereinafter, also referred to as "production method of the present embodiment") includes:
  subjecting the ethylene glycol and the terephthalic acid and/or an ester thereof to an esterification reaction to thereby produce a precursor ester ("esterification reaction step"); and
  adding the spiroglycol to the precursor ester ("adding step"),
  wherein, in the adding, stirring is performed under a condition expressed by expressions (A) and (B) by using a stirrer equipped with a stirring blade:

$0.7011 \times \log$ (spiroglycol addition rate (kg/hr))+
$1.339+0.5 \geq$ stirring blade tip speed (m/s)
$0.7011 \times \log$ (spiroglycol addition rate (kg/hr))+
$1.339-0.5$                               expression (A)

$0.5 \leq$ stirring blade tip speed (m/s)             expression (B).

Because the production method of the present embodiment is configured as described above, the polyester resin with less reduction in intrinsic viscosity at the time of melt retention/melt extrusion can be efficiently produced.

Esterification Reaction Step

In the esterification reaction step, a precursor ester is formed by reacting the ethylene glycol and the terephthalic acid and/or an ester thereof. In the present embodiment, the esterification reaction can be conducted similarly to esterification process in known methods for producing a polyester resin, and known conditions and catalysts can be used. Specific examples include a production method in which a dicarboxylic acid and a diol are directly subjected to an esterification reaction, and a production method in which a dicarboxylic acid and a diol are added to a seed oligomer and subjected to an esterification reaction.

Adding Step

In the adding step, at the time of adding the spiroglycol to the precursor ester, stirring is performed under a condition expressed by expressions (A) and (B) by using a stirrer equipped with a stirring blade:

$0.7011 \times \log$ (spiroglycol addition rate (kg/hr))+
$1.339+0.5 \geq$ stirring blade tip speed
(m/s)$\geq 0.7011 \times \log$ (spiroglycol
addition rate (kg/hr))+$1.339-0.5$          expression (A)

$0.5 <$ stirring blade tip speed (m/s)         expression (B).

In a case where the stirring is performed in a condition expressed by expressions (A) and (B), a polyester resin can be synthesized efficiently while attachment of SPG to a reactor gas phase part is prevented. Furthermore, because attachment of the SPG to the reactor gas phase part is small, an amount of impurities derived from unreacted SPG (deposits of thermally modified unreacted SPG) mixed into the polyester resin can be made small, and thus the reduction percentage of the intrinsic viscosities can be significantly reduced.

As the stirrer, various known stirring apparatuses can be used. Specific examples include, but not limited to, a stirring apparatus equipped with a stirring blade having an anchor shape.

In the production method of the present embodiment, the temperature of the precursor ester in the adding is not particularly limited but is preferably 195° C. or lower from a viewpoint of SPG decomposition suppression.

In the production method of the present embodiment, the atmosphere in which storage, transfer, and addition of the spiroglycol are performed is not particularly limited; however, from a viewpoint of prevention of coloring of a resin and a dust explosion due to mixing of oxygen, these are preferably performed in an inert gas atmosphere.

In the production method of the present embodiment, the moisture content of the spiroglycol is not particularly limited; however, from a viewpoint of SPG decomposition suppression at the time of charging into a reactor, the moisture content is preferably 0.1 mass % or less.

Specifically, the moisture content can be measured by the method described in Examples below.

For example, the moisture content can be adjusted to the range described above by purging with a nitrogen gas having a dew point at atmospheric pressure of −50° C. or lower.

Examples

Hereinafter, the present embodiments will be described in further detail with reference to examples, but the present embodiments are not limited to these examples.

Evaluation Methods

The evaluation methods of the polyester resin in the present examples are as described below.

(1) Composition of Polyester Resin

Copolymerization Ratio of SPG

The copolymerization ratio of the SPG is a ratio of a structural unit amount of SPG to a dicarboxylic acid constituent unit amount in the polyester resin (SPG copolymerization ratio). The ratio of the diol unit to the dicarboxylic acid unit in the polyester resin was calculated based on $^1$H-NMR analysis. The measurement was performed by ECA500 500 MHz, available from JEOL Ltd., as a measurement instrument. By using a deuterated chloroform as a solvent, the measurement was performed by dissolving 50 mg of the polyester resin in 2 g of a solvent.

(2) Glass Transition Temperature and Crystallization Exothermic Peak During Temperature Decrease The glass transition temperature (Tg) of the polyester resin was measured by charging approximately 10 mg of a sample in an unsealed aluminum container and by using a differential scanning calorimeter (model: DSC/TA-60A), available from Shimadzu Corporation, at a temperature increase rate of 20° C./min in a nitrogen gas (50 mL/min)

stream. The temperature at which change occurred in a degree of ½ of the difference between base lines before and after transition of DSC curve was used as the glass transition temperature. After the measurement of the glass transition temperature, the crystallization exothermic peak during temperature decrease was measured based on an area of an exothermic peak appeared when the sample was maintained at 280° C. for 1 minute and then temperature was decreased at a temperature decrease rate of 10° C./min.

(3) Intrinsic Viscosity (IV)

A polyester resin was heated and dissolved in a mixed solvent of phenol/1,1,2,2-tetrachloroethane (mass ratio=6:4) at 90° C., and thus solutions of 0.2, 0.4, and 0.6 g/dL were prepared. The samples were then cooled to 25° C., and thus samples for measurement were prepared. The measurement was performed at a temperature of 25° C. by using Y501 Relative Viscometer, available from Viscotek, as an instrument.

(4) SPG Moisture Content (wt. %)

The measurement of the moisture content of the SPG was performed by quantifying the moisture content in a vaporization condition at 160° C. for 20 minutes by using a Karl Fischer moisture meter (model: CA-200), available from Mitsubishi Chemical Corporation, and a moisture vaporizer (model: VA-236S), and thus the moisture content was determined.

Example 1

In a 1 L reaction tank equipped with an anchor blade having a diameter of 100 mm, a packed tower distillation column, a cold trap, a heating device, a nitrogen introduction tube, and a hopper for spiroglycol (3,9-bis(1,1-dimethyl-2-hydroxyethyl)-2,4,8,10-tetraoxaspiro[5.5]undecane; SPG) addition, 275.7 g of terephthalic acid (TPA) and 128.8 g of ethylene glycol (EG) were charged and subjected to an esterification reaction by an ordinary method, and thus a precursor ester was formed. To the formed precursor ester, 77.3 g of EG and 43 mg of germanium dioxide were further added, and depolymerization was performed at 225° C. and a normal atmospheric pressure. While generated water was distilled off from the reaction product, the reaction was further performed for 1.5 hours. Then, 34 mg of tetra-n-butyl titanate, 31 mg of potassium acetate, and 63 mg of triethyl phosphate were added to the reaction product at 225° C. and the normal atmospheric pressure. Subsequently, heat treatment was performed at 225° C. and 13.3 kPa for 1 hour, and thus unreacted EG was distilled off from the reaction product. After the temperature was lowered to 190° C., the pressure was returned to the normal atmospheric pressure with nitrogen, and 236.4 g of SPG was added in 10 batches for 1 hour with each batch having 23.64 g. At the time of SPG addition, each time, after a predetermined amount of the SPG was charged in a hopper for addition, purging was performed with a nitrogen gas having a dew point at atmospheric pressure of −50° C. or loweruntil the oxygen concentration became 1%, and then addition to the reaction tank was performed. The stirring rate in the reaction tank at the time of addition was 150 rpm, and the stirring blade tip speed was 0.8 m/s. After the pressure was reduced to 13.3 kPa, the reaction was performed for 1 hour, then the reaction product was gradually heated, the pressure was reduced, and finally, the polycondensation reaction was performed at 280° C. in a high vacuum (300 Pa or less). During this time, based on the melt viscosity at 280° C., the stirring rate was decreased, and the reaction was terminated when a predetermined stirring torque was achieved at 25 rpm, and thus a polyester resin was produced. This operation was performed for three times without cleaning the reaction tank, and thus a polyester resin of Example 1 was produced. This polyester resin was used for the measurement of (3) above, and the measured intrinsic viscosity V1 was 0.68. Separately, the produced polyester resin was maintained at 240° C. for 5 minutes, and then an operation of extruding the polyester resin at a shear rate of 122 (1/s) was performed. This polyester resin was also used for the measurement of (3) above, and the measured intrinsic viscosity V2 was 0.67. Thus, the reduction percentage of the intrinsic viscosities before and after the operation was 1.5%.

Note that the stirring conditions of Example 1 satisfied both of expressions (A) and (B):

$$0.7011 \times \log (\text{spiroglycol addition rate (kg/hr)}) + 1.339 + 0.5 \geq \text{stirring blade tip speed (m/s)} \geq 0.7011 \times \log (\text{spiroglycol addition rate (kg/hr)}) + 1.339 - 0.5 \quad \text{expression (A)}$$

$$0.5 \leq \text{stirring blade tip speed (m/s)} \quad \text{expression (B).}$$

Furthermore, the SPG used in Example 1 was in an inert gas atmosphere at the time of addition as well as at the time of storage and transfer in the reaction system, and when the moisture content of the SPG was measured by the Karl Fischer method, the moisture content was 0.1 mass % or less.

Example 2

In a 1 L reaction tank equipped with an anchor blade having a diameter of 100 mm, a packed tower distillation column, a cold trap, a heating device, a nitrogen introduction tube, and a hopper for SPG addition, 275.7 g of TPA and 118.5 g of EG were charged and subjected to an esterification reaction by an ordinary method, and thus a precursor ester was formed. To the formed precursor ester, 87.6 g of EG and 43 mg of germanium dioxide were further added, and depolymerization was performed at 225° C. and a normal atmospheric pressure. While generated water was distilled off from the reaction product, the reaction was further performed for 1.5 hours. Then, 34 mg of tetra-n-butyl titanate, 31 mg of potassium acetate, and 133 mg of triethyl phosphate were added to the reaction product at 225° C. and the normal atmospheric pressure. Subsequently, heat treatment was performed at 225° C. and 13.3 kPa for 1 hour, and thus unreacted EG was distilled off from the reaction product. After the temperature was lowered to 190° C., the pressure was returned to the normal atmospheric pressure with nitrogen, and 161.6 g of SPG was added in 10 batches for 1 hour with each batch having 16.16 g. At the time of SPG addition, each time, after a predetermined amount of the SPG was charged in a hopper for addition, purging was performed with a nitrogen gas having a dew point at atmospheric pressure of −50° C. or lower until the oxygen concentration became 1%, and then addition to the reaction tank was performed. The stirring rate in the reaction tank at the time of addition was 150 rpm, and the stirring blade tip speed was 0.8 m/s. After the pressure was reduced to 13.3 kPa, the reaction was performed for 1 hour, then the reaction product was gradually heated, the pressure was reduced, and finally, the polycondensation reaction was performed at 280° C. in a high vacuum (300 Pa or less). During this time, based on the melt viscosity at 280° C., the stirring rate was decreased, and the reaction was terminated when a predetermined stirring torque was achieved at 25 rpm, and thus a polyester resin was produced. This operation was performed for three times without cleaning the reaction tank, and thus a polyester resin of Example 2 was produced. When the intrinsic viscosities were measured for this polyester resin in the same manner as in Example 1, the intrinsic viscosity V1 was 0.54, the intrinsic viscosity V2 was 0.53, and the reduction percentage of the intrinsic viscosities was 1.9%.

Note that the stirring conditions of Example 2 satisfied both of expressions (A) and (B) above.

Furthermore, the SPG used in Example 2 was in an inert gas atmosphere at the time of addition as well as at the time of storage and transfer in the reaction system, and when the moisture content of the SPG was measured by the Karl Fischer method, the moisture content was 0.1 mass % or less.

Example 3

In a 50 L reaction tank equipped with a double helical blade having a diameter of 330 mm, a packed tower distillation column, a cold trap, a heating device, a nitrogen introduction tube, and an SPG addition inlet, 13.79 kg of TPA and 6.44 kg of EG were charged and subjected to an esterification reaction by an ordinary method, and thus a precursor ester was formed. To the formed precursor ester, 3.87 kg of EG and 2.15 g of germanium dioxide were further added, and depolymerization was performed at 225° C. and a normal atmospheric pressure. While generated water was distilled off from the reaction product, the reaction was further performed for 1.5 hours. Then, 1.70 g of tetra-n-butyl titanate, 1.55 g of potassium acetate, and 7.580 g of triethyl phosphate were added to the reaction product at 225° C. and the normal atmospheric pressure. Subsequently, heat treatment was performed at 225° C. and 13.3 kPa for 1 hour, and thus unreacted EG was distilled off from the reaction product. After the temperature was lowered to 190° C., the pressure was returned to the normal atmospheric pressure with nitrogen, and 11.82 kg of SPG was added in 10 batches for 1 hour with each batch having 1.182 kg. At the time of SPG addition, each time, after a predetermined amount of the SPG was charged in a hopper for addition, purging was performed with a nitrogen gas having a dew point at atmospheric pressure of −50° C. or lower until the oxygen concentration became 1%, and then addition to the reaction tank was performed. The stirring rate in the reaction tank at the time of addition was 110 rpm, and the stirring blade tip speed was 1.9 m/s. After the pressure was reduced to 13.3 kPa, the reaction was performed for 1 hour, then the reaction product was gradually heated, the pressure was reduced, and finally, the polycondensation reaction was performed at 280° C. in a high vacuum (300 Pa or less). During this time, based on the melt viscosity at 280° C., the stirring rate was decreased, and the reaction was terminated when a predetermined stirring torque was achieved at 25 rpm, and thus a polyester resin was produced. This operation was performed for twice without cleaning the reaction tank, and thus a polyester resin of Example 3 was produced. When the intrinsic viscosities were measured for this polyester resin in the same manner as in Example 1, the intrinsic viscosity V1 was 0.68, the intrinsic viscosity V2 was 0.67, and the reduction percentage of the intrinsic viscosities was 1.5%.

Note that the stirring conditions of Example 3 satisfied both of expressions (A) and (B) above.

Furthermore, the SPG used in Example 3 was in an inert gas atmosphere at the time of addition as well as at the time of storage and transfer in the reaction system, and when the moisture content of the SPG was measured by the Karl Fischer method, the moisture content was 0.1 mass % or less.

Example 4

A polyester resin of Example 4 was produced in the same manner as in Example 3 except for changing the stirring rate in the reaction tank at the time of the SPG addition to 140 rpm and changing the stirring blade tip speed to 2.4 m/s. When the intrinsic viscosities were measured for this polyester resin in the same manner as in Example 1, the intrinsic viscosity V1 was 0.69, the intrinsic viscosity V2 was 0.69, and the reduction percentage of the intrinsic viscosities was 0%.

Note that the stirring conditions of Example 4 satisfied both of expressions (A) and (B) above.

Example 5

A polyester resin of Example 5 was produced in the same manner as in Example 3 except for adding 11.82 kg of the SPG in 15 batches for 1.5 hours with each batch having 0.788 kg. When the intrinsic viscosities were measured for this polyester resin in the same manner as in Example 1, the intrinsic viscosity V1 was 0.68, the intrinsic viscosity V2 was 0.67, and the reduction percentage of the intrinsic viscosities was 1.5%.

Note that the stirring conditions of Example 5 satisfied both of expressions (A) and (B) above.

Comparative Example 1

Production of a polyester resin was performed in the same manner as in Example 1 except for adding the SPG at once (added 236.4 g in one batch for 6 minutes); however, the SPG aggregated in a liquid surface of the precursor ester solution and the SPG was not dissolved into the solution, and thus the polyester resin could not be synthesized. Note that the stirring conditions of Comparative Example 1 did not satisfy expression (A) above.

Comparative Example 2

A polyester resin of Comparative Example 2 was produced in the same manner as in Example 1 except for changing the rotation rate to 75 rpm and changing the stirring blade tip speed to 0.4 m/s. When the intrinsic viscosities were measured for this polyester resin in the same manner as in Example 1, the intrinsic viscosity V1 was 0.68, the intrinsic viscosity V2 was 0.65, and the reduction percentage of the intrinsic viscosities was 4.4%. Note that the stirring conditions of Comparative Example 2 did not satisfy expression (B) above.

Comparative Example 3

A polyester resin of Comparative Example 3 was produced in the same manner as in Example 2 except for changing the rotation rate to 75 rpm and changing the stirring blade tip speed to 0.4 m/s. When the intrinsic viscosities were measured for this polyester resin in the same manner as in Example 1, the intrinsic viscosity V1 was 0.54, the intrinsic viscosity V2 was 0.51, and the reduction percentage of the intrinsic viscosities was 5.6%. Note that the stirring conditions of Comparative Example 3 did not satisfy expression (B) above.

Comparative Example 4

A polyester resin of Comparative Example 4 was produced in the same manner as in Example 3 except for adding 11.82 kg of the SPG in 3 batches for 15 minutes with each batch having 3.94 kg. When the intrinsic viscosities were measured for this polyester resin in the same manner as in Example 1, the intrinsic viscosity V1 was 0.67, the intrinsic viscosity V2 was 0.64, and the reduction percentage of the intrinsic viscosities was 4.5%. Note that the stirring conditions of Comparative Example 4 did not satisfy both of expressions (A) and (B) above.

Comparative Example 5

A polyester resin of Comparative Example 5 was produced in the same manner as in Example 3 except for changing the rotation rate to 70 rpm and changing the stirring blade tip speed to 1.2 m/s. When the intrinsic viscosities were measured for this polyester resin in the same manner as in Example 1, the intrinsic viscosity V1 was 0.68, the intrinsic viscosity V2 was 0.64, and the reduction percentage of the intrinsic viscosities was 5.9%. Note that the stirring conditions of Comparative Example 5 did not satisfy both of expressions (A) and (B) above.

Comparative Example 6

A polyester resin of Comparative Example 6 was produced in the same manner as in Example 1 except for using the SPG in which the SPG moisture content determined by the Karl Fischer method was adjusted to 0.5 mass %. When the intrinsic viscosities were measured for this polyester resin in the same manner as in Example 1, the intrinsic viscosity V1 was 0.69, the intrinsic viscosity V2 was 0.66, and the reduction percentage of the intrinsic viscosities was 4.3%. Note that the stirring conditions of Comparative Example 6 satisfied both of expressions (A) and (B) above.

Comparative Example 7

A polyester resin of Comparative Example 7 was produced in the same manner as in Example 1 except that, after heat treatment was performed at 225° C. at 13.3 kPa for 1 hour and thus unreacted EG was distilled off from the reaction product, the pressure was returned to a normal atmospheric pressure with nitrogen without lowering the temperature to 190° C. and the SPG was added at 225° C. When the intrinsic viscosities were measured for this polyester resin in the same manner as in Example 1, the intrinsic viscosity V1 was 0.68, the intrinsic viscosity V2 was 0.65, and the reduction percentage of the intrinsic viscosities was 4.4%. Note that the stirring conditions of Comparative Example 7 satisfied both of expressions (A) and (B) above.

For the polyester resins of Examples 1 to 5 and Comparative Examples 2 to 7, the results of the measurements (1) to (3) described above are shown in Table 1.

TABLE 1

|  |  | Example 1 | Example 2 | Example 3 | Example 4 | Example 5 | Comparative Example 1 |
|---|---|---|---|---|---|---|---|
| Resultant resin physical properties |  |  |  |  |  |  |  |
| Tg | (° C.) | 109 | 98 | 109 | 109 | 109 | — |
| SPG in diol constituent unit | (mol %) | 45.7 | 31.1 | 45.8 | 45.7 | 45.7 | — |
| PTA in dicarboxylic acid constituent unit |  | 100 | 100 | 100 | 100 | 100 | — |
| Crystallization exothermic peak during temperature decrease | (J/g) | 0 | 0 | 0 | 0 | 0 | — |
| Limiting viscosity V1 |  | 0.68 | 0.54 | 0.68 | 0.69 | 0.68 | — |
| Limiting viscosity V2 |  | 0.67 | 0.53 | 0.67 | 0.69 | 0.67 | — |
| Reduction percentage of intrinsic viscosities | (%) | 1.5 | 1.9 | 1.5 | 0 | 1.5 | — |
| Stirring conditions |  |  |  |  |  |  |  |
| Rotation rate | rpm | 150 | 150 | 110 | 140 | 110 | 150 |
| Blade diameter | [mm] | 100 | 100 | 330 | 330 | 330 | 100 |
| Stirring blade tip speed | (m/s) | 0.8 | 0.8 | 1.9 | 2.4 | 1.9 | 0.8 |
| SPG addition rate | (kg/hr) | 0.2364 | 0.1616 | 11.82 | 11.82 | 7.880 | 2.364 |
| expression (A) | Upper limit | 1.4 | 1.3 | 2.6 | 2.6 | 2.5 | 2.1 |
| expression (A) or expression (B) | Lower limit | 0.5 | 0.5 | 1.6 | 1.6 | 1.5 | 1.1 |

|  |  | Comparative Example 2 | Comparative Example 3 | Comparative Example 4 | Comparative Example 5 | Comparative Example 6 [1)] | Comparative Example 7 [2)] |
|---|---|---|---|---|---|---|---|
| Resultant resin physical properties |  |  |  |  |  |  |  |
| Tg | (° C.) | 109 | 98 | 109 | 109 | 109 | 109 |
| SPG in diol constituent unit | (mol %) | 45.5 | 30.6 | 45.8 | 45.8 | 45.5 | 45.6 |
| PTA in dicarboxylic acid constituent unit |  | 100 | 100 | 100 | 100 | 100 | 100 |

TABLE 1-continued

|  |  |  |  |  |  |  |  |
|---|---|---|---|---|---|---|---|
| Crystallization exothermic peak during temperature decrease | (J/g) | 0 | 0 | 0 | 0 | 0 | 0 |
| Limiting viscosity V1 |  | 0.68 | 0.54 | 0.67 | 0.68 | 0.69 | 0.68 |
| Limiting viscosity V2 |  | 0.65 | 0.51 | 0.64 | 0.64 | 0.66 | 0.65 |
| Reduction percentage of intrinsic viscosities | (%) | 4.4 | 5.6 | 4.5 | 5.9 | 4.3 | 4.4 |
| Stirring conditions |  |  |  |  |  |  |  |
| Rotation rate | rpm | 75 | 75 | 110 | 70 | 150 | 150 |
| Blade diameter | [mm] | 100 | 100 | 330 | 330 | 100 | 100 |
| Stirring blade tip speed | (m/s) | 0.4 | 0.4 | 1.9 | 1.2 | 0.8 | 0.8 |
| SPG addition rate | (kg/hr) | 0.2364 | 0.1616 | 47.28 | 11.82 | 0.2364 | 0.2364 |
| expression (A) | Upper limit | 1.4 | 1.3 | 3.0 | 2.6 | 1.4 | 1.4 |
| expression (A) or expression (B) | Lower limit | 0.5 | 0.5 | 2.0 | 1.6 | 0.5 | 0.5 |

1) SPG containing 0.5 wt. % $H_2O$ was used
2) SPG was added at liquid temperature of 225° C.

The present application claims priority to a Japanese Patent Application (JP 2020-188436) filed on Nov. 12, 2020, the content of which is incorporated herein by reference.

The invention claimed is:

1. A method for producing a polyester resin comprising:
a diol constituent unit comprising a unit a1 derived from spiroglycol represented by formula (1) and a unit a2 derived from ethylene glycol; and
a dicarboxylic acid constituent unit comprising a unit b derived from terephthalic acid and/or an ester thereof, wherein
a content of the unit a1 is from 5 to 60 mol % and a content of the unit a2 is from 30 to 95 mol %, based on a total amount of the unit a1 and the unit a2,
a content of the unit b is from 80 to 100 mol % based on a total amount of the dicarboxylic acid constituent unit, and
the following conditions (1) to (3) are satisfied:
(1) an intrinsic viscosity V1 of the polyester resin is from 0.45 to 0.85 dL/g, the intrinsic viscosity V1 being measured at 25° C. by using a mixed solvent comprising phenol and 1,1,2,2-tetrachloroethane in a weight ratio of 6:4;
(2) when an operation of extruding the polyester resin at a shear rate of 122 (l/s) is performed after the polyester resin is kept at 240° C. for 5 minutes, a reduction percentage of intrinsic viscosities before and after the operation, in terms of (V1−V2)/V1, is 3% or less, where V2 refers to an intrinsic viscosity measured based on the condition (1) after the operation; and
(3) a glass transition temperature of the polyester resin measured by a differential scanning calorimeter is 90° C. or higher and a heat quantity of a crystallization exothermic peak during temperature decrease is 5 J/g or less,

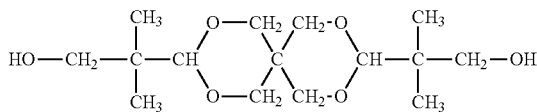

(1)

, the method comprising:
subjecting the ethylene glycol and the terephthalic acid and/or an ester thereof to an esterification reaction to thereby produce a precursor ester; and
adding the spiroglycol to the precursor ester,
wherein, in the adding, stirring is performed under a condition expressed by expressions (A) and (B) by using a stirrer equipped with a stirring blade:

7011×log (spiroglycol addition rate (kg/hr))+1.339+ 0.5≥stirring blade tip speed (m/s)≥0.7011×log (spiroglycol addition rate (kg/hr))+1.339−0.5    expression (A)

5≤stirring blade tip speed (m/s)    expression (B).

2. The method for producing the polyester resin according to claim 1, wherein a temperature of the precursor ester in the adding is 195° C. or lower.

3. The method for producing the polyester resin according to claim 1, wherein storage, transfer, and addition of the spiroglycol are performed in an inert gas atmosphere.

4. The method for producing the polyester resin according to claim 1, wherein a moisture content of the spiroglycol is 0.1 mass % or less.

* * * * *